United States Patent [19]
Takada et al.

[11] Patent Number: 5,460,896
[45] Date of Patent: Oct. 24, 1995

[54] FUEL CELL

[75] Inventors: Noriyuki Takada; Junko Shimizu, both of Hokkaido, Japan

[73] Assignee: Kabushikikaisha Equos Research, Japan

[21] Appl. No.: 181,048

[22] Filed: Jan. 14, 1994

[30]   Foreign Application Priority Data

Jan. 22, 1993  [JP]  Japan ................................. 5-027362
Jun. 28, 1993  [JP]  Japan ................................. 5-178544

[51] Int. Cl.⁶ .................................................. H01M 4/94
[52] U.S. Cl. ................... 429/33; 429/35; 429/42; 429/44
[58] Field of Search ................... 429/44, 45, 30, 429/35, 33, 42

[56]          References Cited
          U.S. PATENT DOCUMENTS

| H16 | 1/1986 | Kaun | 429/45 X |
|---|---|---|---|
| 4,476,002 | 10/1984 | Howard et al. | 429/44 X |
| 5,071,717 | 12/1991 | Bushnell | 429/44 X |
| 5,242,764 | 9/1993 | Dhar | 429/30 |

FOREIGN PATENT DOCUMENTS

3-295176  12/1991  Japan .

*Primary Examiner*—Stephen Kalafut
*Attorney, Agent, or Firm*—Lorusso & Loud

[57]           ABSTRACT

A fuel cell which essentially has an electrolyte membrane and fuel and oxidation electrodes in a confronting state to each other holding the electrolyte membrane between them and, more particularly, to provide an advantageous fuel cell having the fuel and oxidation electrodes each of which has a gas diffusion layer formed from porous metallic material; a catalyst layer contacting with the electrolyte membrane; a corrosion resistant layer oriented intermediate the gas diffusion layer and the catalyst layer such that strong acidic constituent contained in the electrolyte membrane does not corrode the gas diffusion layer.

12 Claims, 6 Drawing Sheets

FUEL CELL

BACKGROUND OF THE INVENTION

1. Field of the Invention

This invention relates to a fuel cell and, more particularly, to a solid-state polymer fuel cell in which a polymer ion-exchange membrane is utilized as one of preferable electrolyte membranes.

2. Description of the Related Art

The conventional solid-state polymer fuel cell known in the art has a polymer ion-exchange membrane such as Nafion (Trademark of Dupont) and a pair of fuel and oxidation electrodes provided in a state confronting to each other through the polymer ion-exchange membrane so that the fuel cell fulfills its function as an electric power source in a vehicle when hydrogen and oxygen are supplied into the fuel and oxidation electrodes, respectively.

Such a solid-state polymer fuel cell has been expected to be one of preferable electric power sources for an electric motor used in the vehicle solely or in combination with an internal combustion engine such as a gasoline engine since it has achieved lightweighting and reduced space in total and the used electrolyte membrane always kept its solid state without loosing its quantity.

Figure 8:
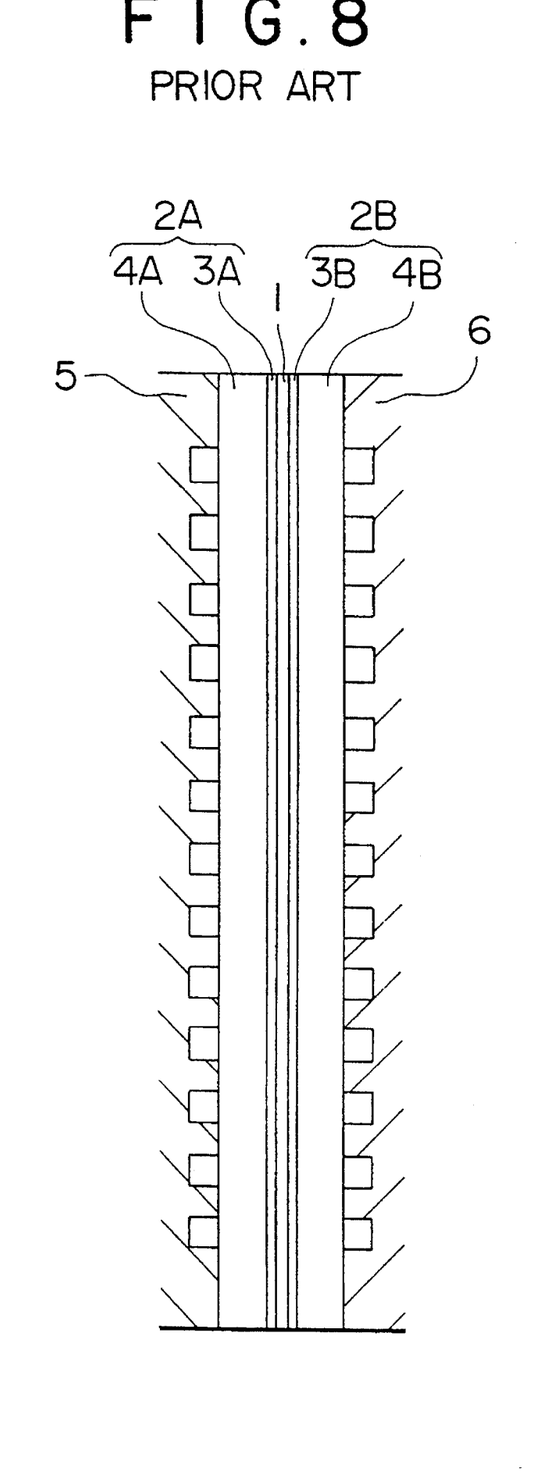
FIG. 8 depicts the overall structure of the conventional fuel cell.

The Japanese Patent Application Laid-open No. Hei3-295176 teaches a typical conventional solid-state polymer fuel cell as depicted in FIG. 8. This fuel cell is generally defined by a solid-state polymer electrolyte membrane 1 and gas diffusion electrodes 2A and 2B fixed on the solid-state polymer electrolyte membrane 1 so as to confront to each other via the membrane 1. The gas diffusion electrode 2A as the fuel electrode is provided to receive therein hydrogen gas through a gas separator 5 and the other gas diffusion electrode 2B as the oxidation electrode is provided to receive therein oxygen gas through a gas separator 6.

Both gas separators 5 and 6 are generally constructed of a conductive thin plate (e.g., metal plate) preventing a mixing of the hydrogen and oxygen gases supplied to the fuel and oxidation electrodes respectively when plural cells are connected in series. As the gas separators are able to electrically relate to the fuel and oxidation electrodes in series, they are adapted to electrically connect one with the other when plural cells are connected in series.

The gas diffusion electrode 2A, 2B is defined by a reaction membrane 3A, 3B adjacent to the solid-state electrolyte membrane 1 and a gas diffusion membrane 4A, 4B adjacent to the gas separator 5, 6.

The gas diffusion membrane 4A, 4B is adapted to preferably diffuse the gas such as hydrogen or oxygen fed into the gas separator 5, 6 and transfer the diffused gas to the reaction membrane 3A, 3B. The advantages inherent in the gas diffusion membrane 4A, 4B are not to be corroded by sulfonic group ($-SO_3H$) as an ingredient of the solid-state polymer electrolyte membrane 1 but to have an electrical conductivity. Therefore, it has generally been considered that a sheet-state carbon was the most preferable material for constructing the gas diffusion membrane.

The reaction membrane 3A, 3B is expected to carry out a so-called battery reaction at an interface contacting with the solid-state polymer electrolyte membrane 1 when receiving the gas fed through the gas diffusion membrane 4A, 4B. Accordingly, a sintered mixture consisting of a water-repellent material such as polytetrafluorethylene (PTFE) and a catalyst particles such as platinum (Pt) or platinum supported on carbon black (Pt/C) has generally been used in the art.

However, the sheet-state carbon used for the gas diffusion membrane for the electrode in the above-mentioned conventional fuel cell unexpectedly shows a high electrical resistance.

The gas permeability of the sheet-state carbon just has a gas-supplying rate of 850 ml·mm/hr·cm$^2$·mmAq according to data shown in a catalog prepared for a generally known carbon paper.

In view of the above, when one considers to achieve an effective electricity generation in the one or plural fuel cells, the feature of the gas diffusion membrane, that is, to have a lower electrical resistance than the sheet-state carbon and a high gas permeability becomes particularly important.

Accordingly, the inventor of the present application had conceived to use, for the gas diffusion membrane or layer, a member made from porous metallic material such as nickel (Ni) foam in stead of the sheet-state carbon. Several examples conducted by the inventor based on the above analysis show that an electrode employing the gas diffusion membrane made from such a porous metallic material has a low electrical resistance and more effective diffusion of the gas fed therein compared with that of the sheet-state carbon.

On the contrary however, the nickel is easy to be corroded by sulfonic group contained in the electrolyte membrane to thereby dissolve into the electrolyte membrane unexpectedly. The inventor has therefore improved the conventional fuel cell as taught in the Japanese Patent Application No. Hei5-27362, wherein a corrosion resistant layer made from carbon is newly introduced between the reaction membrane or a catalyst layer and the gas diffusion membrane or a gas diffusion layer.

More particularly, in the above-mentioned improved fuel cell, the fuel cell comprised a solid-state electrolyte membrane and fuel and oxidation electrodes each of which has a gas diffusion layer made from porous metallic material to receive therein a hydrogen or oxygen gas, a catalyst layer contacting with the electrolyte membrane and, between the gas diffusion layer and the catalyst layer, a corrosion resistant layer functioning not to corrode the gas diffusion layer by strong acidic constituent contained in the electrolyte membrane.

The fuel cell according to the Japanese Patent Application No. Hei5-27362 may dissolve disadvantages recognized in the above-described conventional fuel cell, but it has still been required for the person in the art to reduce electrical resistance as much as possible when using.

Other objects, features and advantages of the present invention will become apparent upon reading the following specification and claims when taken in conjunction with the accompanying drawings.

SUMMARY OF THE INVENTION

To attain this object, the present invention is to provide a fuel cell which essentially has an electrolyte membrane and fuel and oxidation electrodes in a confronting state to each other holding the electrolyte membrane between them and, more particularly, to provide an advantageous fuel cell having the fuel and oxidation electrodes each of which has a gas diffusion layer formed from porous metallic material; a catalyst layer contacting with the electrolyte membrane; a corrosion resistant layer oriented intermediate the gas diffusion layer and the catalyst layer such that strong acidic constituent contained in the electrolyte membrane does not corrode the gas diffusion layer.

The above invented fuel cell may be understood to further have, on each outsidemost of the respective electrodes, a conductive separator.

The following fuel cell should be understood to be included in this invention in view of attaining the same object, that is a fuel cell has an electrolyte membrane; an electrode core adjacent to the electrolyte membrane; the electrode core including, a catalyst layer contacting with the electrolyte membrane and a corrosion resistant layer preventing corrosive effect derived from strong acidic constituent contained in the electrolyte membrane; and a gas-flow separator contacting with the corrosion resist;ant layer of the electrode core; the gas-flow separator including, a gas diffusion layer contacting with the corrosion resistant layer on one sidle thereof and a conductive separator secured to the other side of the gas diffusion layer, whereby the corrosion resistant layer and the gas diffusion layer are interconnected to each other closely by an externally applied pressure so that an interface between the two layers is formed into a rough state. In this arrangement, the corrosion resistant layer and the gas diffusion layer are interconnected by pressure to decrease the thickness thereof, so that the electrical resistance will be effectively decreased.

According to the above-mentioned invention, the gas diffusion layer made from porous metallic material has a rather low electrical resistance and a fine diffusion efficiency for the gas respectively fed into the fuel and oxidation electrodes so that the efficiency of electricity generation can be raised.

The corrosion resistant layer provided between the gas diffusion layer and the catalyst layer is preferably to be made from a sheet-layered carbon.

BRIEF DESCRIPTION OF THE DRAWINGS

FIG. 2 depicts a diagrammatic view of an electrode core;

FIG. 3 depicts a gas-flow separator;

FIG. 4 depicts a single cell structure assembled by the electrode core shown in FIG. 2 and the two gas-flow separators shown in FIG. 3;

FIG. 6 depicts a schematical view of plural fuel cells in series;

FIG. 7 depicts an explanatory view when conducting an experiment in order to obtain a resistivity index; and FIG. 8 depicts the overall composition of the conventional fuel cell.

Certain terminology will be used in the following description for convenience in reference only and will not be limiting. Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE PREFERRED EMBODIMENT(S)

Figure 1:
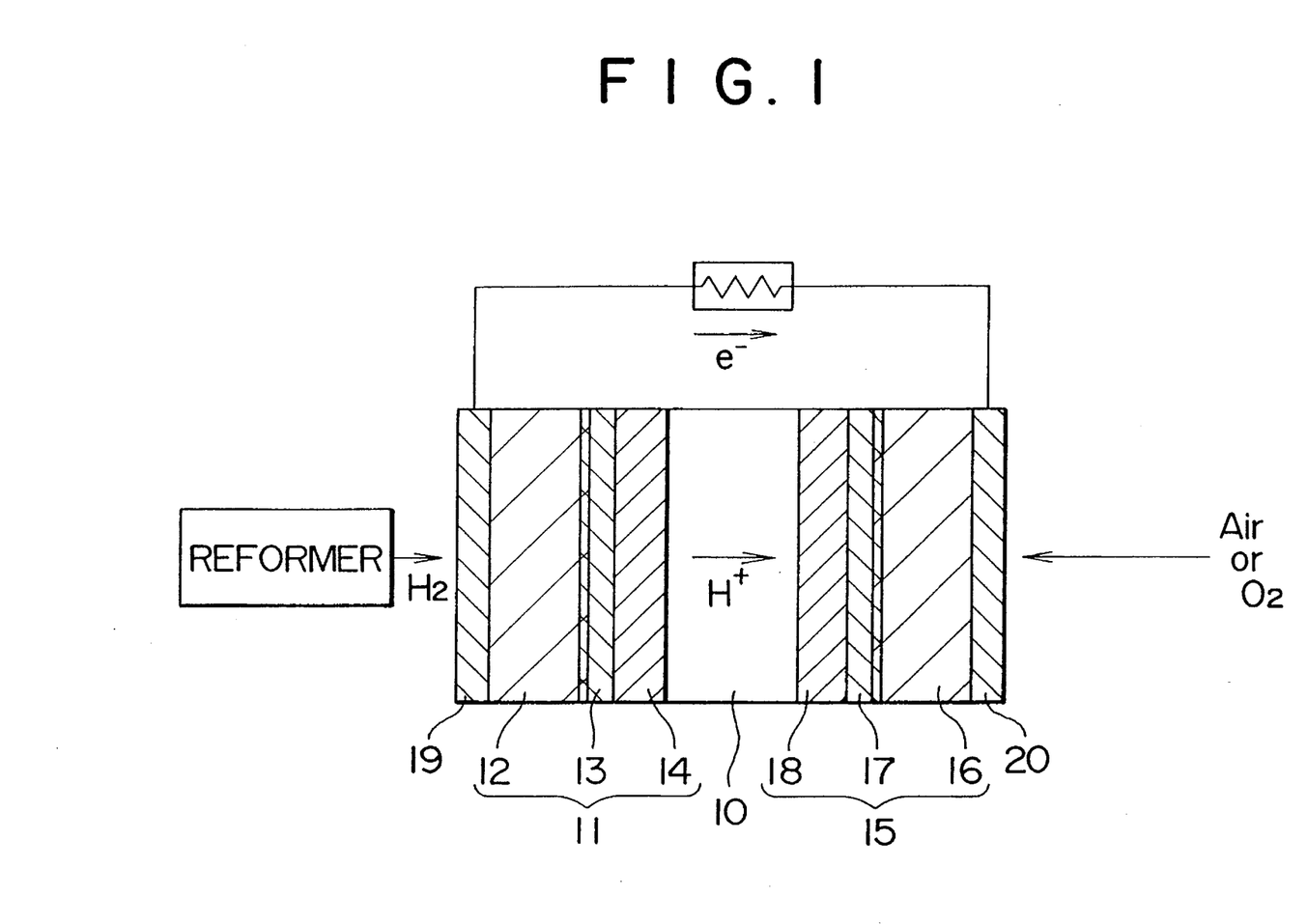
FIG. 1 depicts a diagrammatic view of the entire structure of a fuel cell according to the present invention.

FIG. 1 depicts a diagrammatic view of the overall structure of a fuel cell according to the present invention and, more particularly, a laminated state of a solid-state polymer electrolyte membrane 10, a fuel electrode 11 and an oxidation electrode 15 in this order so that the electrodes 11 and 15 contact with both sides of the membrane 10, respectively. The solid-state polymer electrolyte membrane 10 as the ion-exchange membrane is recommended to be Nation, but it can be replaced with PSSA-PVA (polystyrene sulfonic acid—polyvinylalcohol copolymer) or PSSA-EVOH (polystyrene sulfonic acid—ethylene vinylalcohol copolymer).

The fuel electrode 11 receives therein hydrogen gas as fuel, while the oxidation electrode 15 receives air containing oxygen as oxidant. In the fuel electrode 11, the chemical reaction of $H_2 \rightarrow 2H^+ + 2e^-$ is shown and, in the oxidation electrode 15, the chemical reaction of $1/2O_2 + 2H^+ + 2e^- \rightarrow H_2O$ is shown whereat, as can be seen from FIG. 1, hydrogen ion ($H^+$) move to the oxidation electrode 15 from the fuel electrode 11 through the solid-sate polymer electrolyte membrane 10 as well as electron flow from a conductive separator 19 fixed on the fuel electrode 11 to a conducive separator 20 on the oxidation electrode 15 to generate electrical power. Incidentally, the orientation of the conductive separators 19 and 20 will become apparent later.

The fuel electrode 11 as one electrode in the fuel cell including the solid-state polymer electrolyte membrane 10 is structured with a gas diffusion layer 12, a corrosion .resistant carbon layer 13 contacting with the gas diffusion layer 12 and a catalyst layer 14 contacting with the solid-state polymer electrolyte membrane 10.

The gas diffusion layer 12 is formed by e.g. a porous metallic material which can be obtained by soaking a generally known nickel-foam sheet (thickness of 800~1000 μm) in a PTFE solution of about 7.5 weight % for 2 minutes and then drying it in an inactive gas atmosphere.

The corrosion resistant carbon layer 13 is to be a generally known a sheet-layered carbon. Incidentally, particles in the sheet-layered carbon are coated by hydrofuge material contained in the PTFE solution.

The catalyst layer 14 is made by spreading, on the corrosion resistant layer 13, a mixture including a catalyst supported on carbon black and an ion-exchange resin as one component of the solid-state polymer electrolyte membrane 10 in accordance with a press or screen printing method.

As a preferable catalyst, platinum has been recommended generally in use, but it tends to be poisoned by carbon monoxide contained in the hydrogen gas fed into the fuel electrode 11, even if the hydrocarbon gas such as methanol is preliminary processed in a reformer (shown in FIG. 1) before being fed into the fuel electrode 11. Therefore, the most preferable material for the catalyst is an alloy essentially including Pt/Ru or Pt/Sn.

The gas diffusion layer 12 has a thickness of 500~800 μm. The thickness of the carbon layer 13 and the catalyst layer 14 are 100~150 μm and 10~50 μm, respectively, but they are recommended to be thinner and increase the interface area between them as much as possible without inhibiting the electrical efficiency of electrode in order to decrease electrical resistance.

Incidentally, the interconnecting state between the gas diffusion layer 12 and the corrosion resistant carbon layer 13 are so closed by an externally applied pressure that the thickness of the fuel electrode 11 results in thinner than their thickness before laminated one on the other.

Now turning to the oxidation electrode 15, but it can be understood such that the entire structure and the manufacturing steps thereof are substantially same as explained in the fuel electrode and, more particularly, it comprises a gas diffusion layer 16 made from the porous metallic material to which the air (oxygen) is supplied, a corrosion resistant carbon layer 17 adjacent to the gas diffusion layer 16 and a catalyst layer 18 contacting with the solid-state polymer electrolyte membrane 10. Incidentally, as has already been explained in the fuel electrode, the gas diffusion layer 16 and the corrosion resistant carbon layer 17 are also interconnected each other as in the fuel electrode 11.

When the reformer will be optionally used as shown in FIG. 1, the material for catalyst layer 18 in the oxidation electrode 15 can be formed by platinum since the catalyst layer 18 is not probable to be poisoned by carbon monoxide as worried in the fuel electrode 11.

As can be seen from FIG. 1, the fuel electrode 11 and the oxidation electrode 15 are usually provided with, as outermost layers, the gas separators 19 and 20 as the conductive separator adjacent to the gas diffusion layers 12 and 16, respectively. Incidentally, the combination of the gas diffusion layer and the gas separator shall be mentioned as a gas-flow separator in the followings and the combination of the corrosion resistant carbon layer and the catalyst layer shall be mentioned as an electrode core. The entire composition of the fuel cell according to the present invention can be obtained by applying a cold pressing of 10~20 kg/cm² to an assembled state consisting of one solid-state electrolyte membrane, two electrode cores outside of the solid-state electrolyte membrane and further two gas-flow separators arranged outside of the respective electrode cores as shown in FIG. 1.

One of the most preferable process for manufacturing the above-explained fuel cell will become apparent below.

1. Steps for assembling the electrode cores

The electrode core can be produced by pasting, on one side of the sheet-layered carbon which is preliminary processed in the PTFE solution, a mixture including platinum supported on carbon black or ruthenium, an ion-exchange membrane such as Nafion as the solid-state electrolyte membrane, and a viscous material made by water, alcohol, glycerin, etc. and thereafter by drying the viscous material at the temperature of 80° C. in a nitrogen gas or in a low vacuum. This process also means to form the catalyst layer on one side of the corrosion resistant carbon layer.

Figure 2:
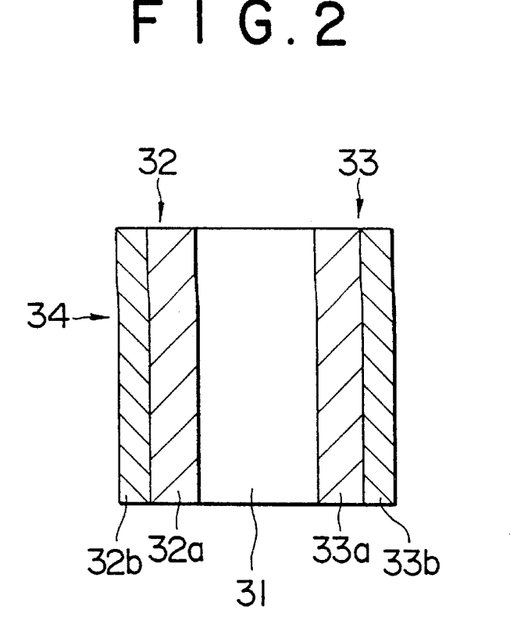
FIG. 2 is an elevational view, in cross-section, of an electrode core suitable for use in the fuel cell of FIG. 1.

The above-mentioned electrode core defined by the carbon layer and the catalyst layer is prepared at least two sets and they are secured on the solid-state electrolyte membrane by a hot press method carried out at a temperature of 130° C., under the pressure of 150 kg/cm² or less and for an interval of 20 sec~3 min. to thereby obtain the electrode core 34 as shown in FIG. 2. Incidentally, the reference numeral 32a and 33a designate the catalyst layer in which the chemical reaction takes place and the numeral 32b and 33b designate the corrosion resistant carbon layer.

2. Steps for assembling the gas-flow separator

The porous metallic material such as Ni foam (e.g., "Selmet", Trademark of Sumitomo Denko) or SUS (e.g., "Naslon", Trademark of Nippon Seisen) in a mesh state is soaked in the PTFE solution and dried in $N_2$ gas atmosphere at a temperature of 350° C. so as to have a water-repellent property.

The thus-processed porous metallic material is attached to one side of the separator made from aluminum (Al), copper (Cu) or carbon having O (zero) gas permeability and is further securely connected with the separator by means of a sealant such as a thermoset resin adhesive additionally fed to the interface between them to increase air tight.

Figure 3:
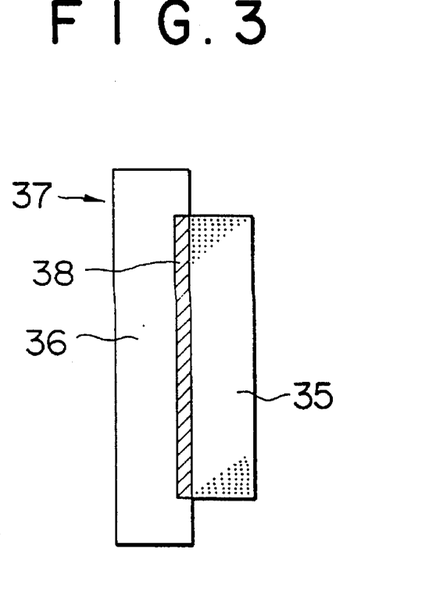
FIG. 3 is an elevational view, in cross-section, depicting a gas-flow separator.

Accordingly, as shown in FIG. 3, the objective gas-flow separator 37 defined by the gas diffusion layer 35 and the separator 36 in an interconnecting state can be obtained. Incidentally, the reference numeral 38 designates the sealant.

3. Steps for assembling single fuel cell

Figure 4:
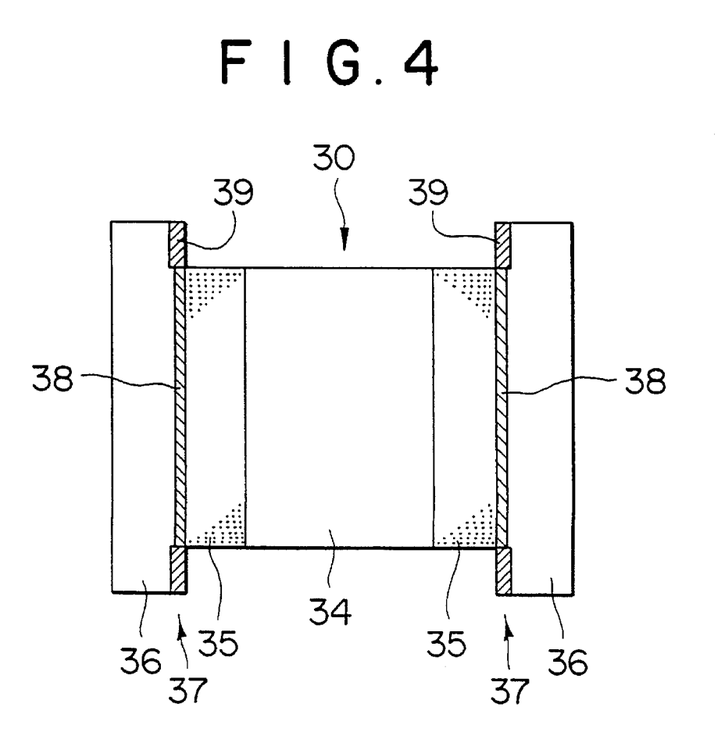
FIG. 4 is an elevational view, in cross-section, of a single cell structure including the electrode core shown in FIG. 2 and two of the gas-flow separators shown in FIG. 3.
Figure 5:
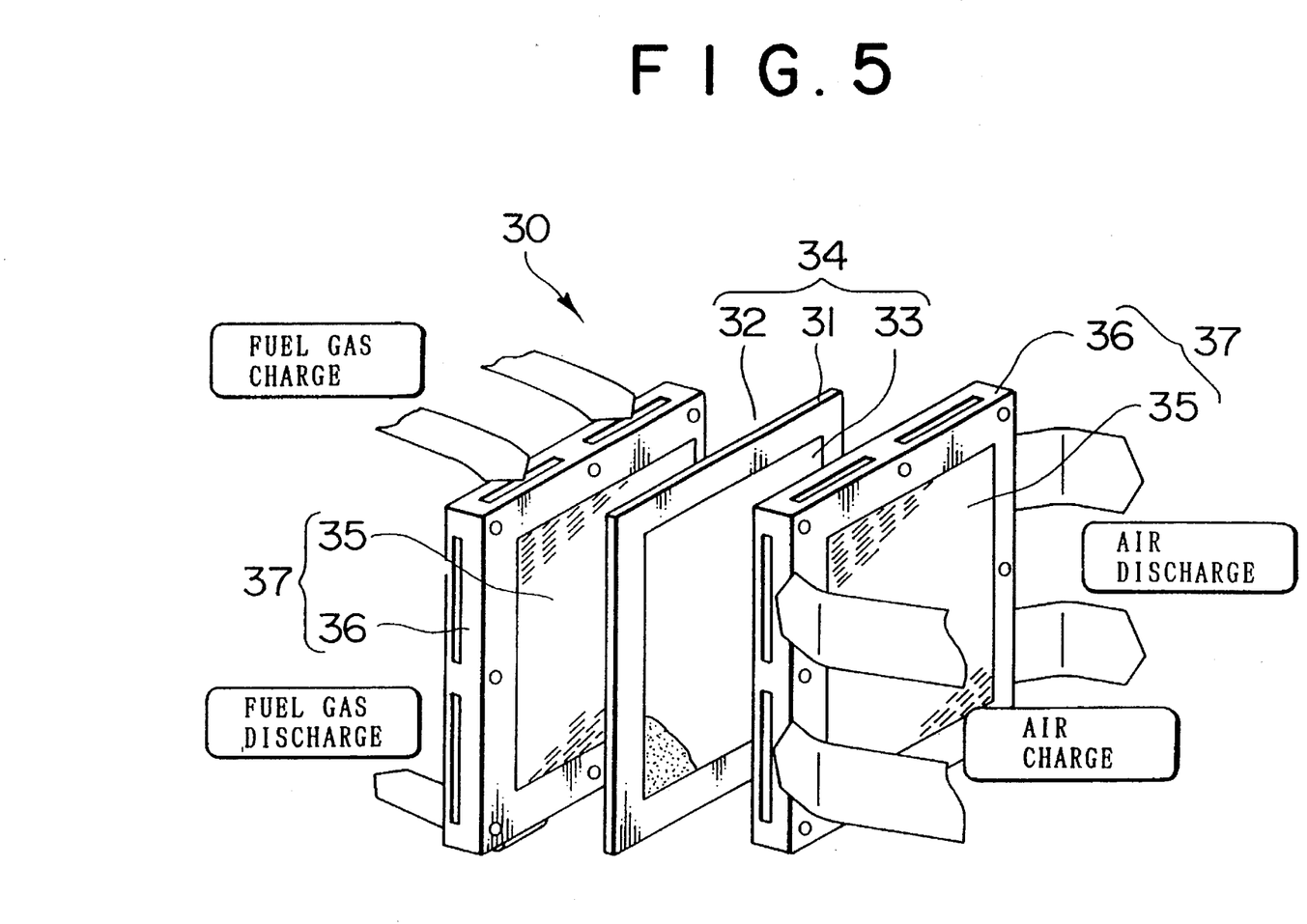
FIG. 5 depicts an exploded perspective view of the single cell shown in FIG. 4.

A single fuel cell can be assembled with the structure 34 shown in FIG. 2 and two gas-flow separators 37 shown in FIG. 3. The connection between two members 34 and 37 is done, as shown in FIGS. 4 and 5, by a sealant spreaded the interface between them under an external pressure of 10 kg/cm². The peripheral section of the separator exposed from the gas diffusion layer is solidified by an additional sealant.

4. Steps for laminating several fuel cell

Figure 6:
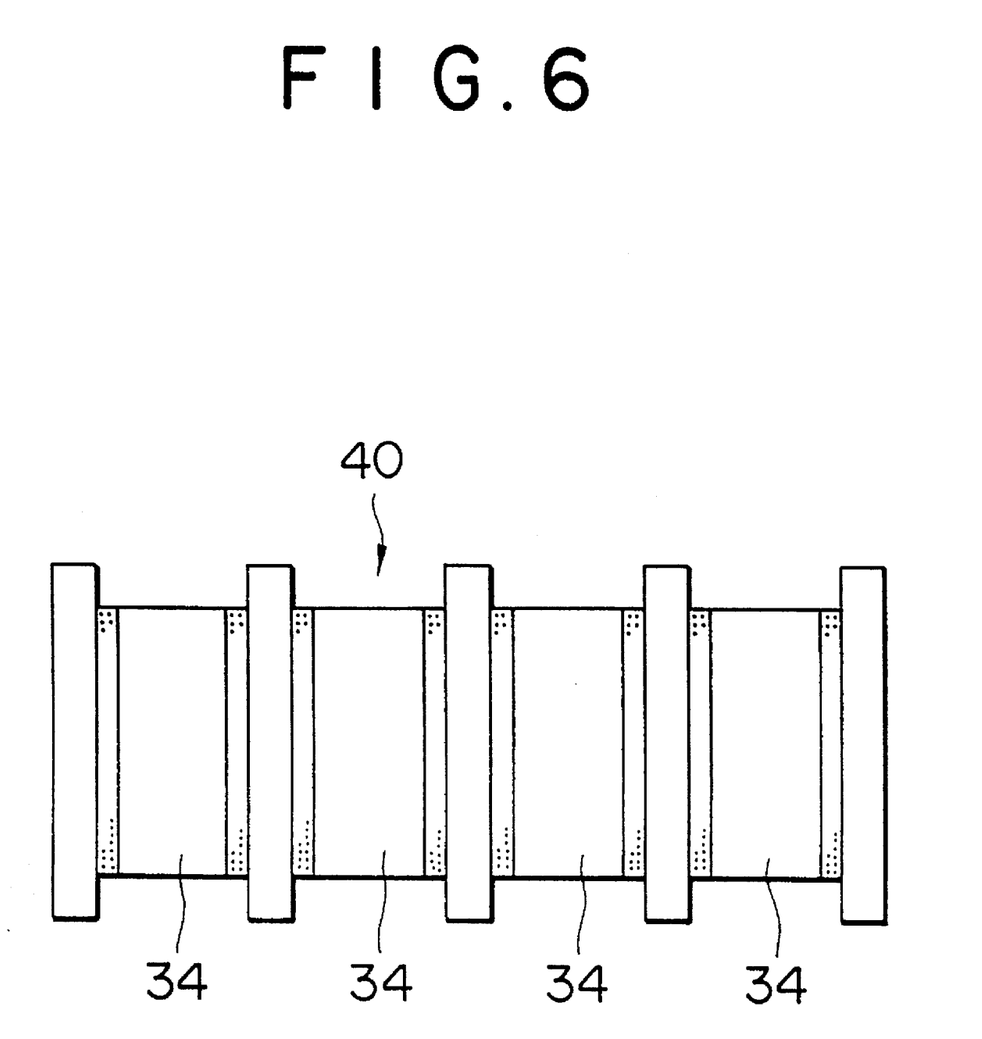
FIG. 6 is a schematic view of plural fuel cells in series.

The several fuel cells in series, for example 4-fuel cell, can be obtained as shown in FIG. 6 by using the gas-flow separator 37 as a connector or coupling for next structures shown in FIG. 2 by the same method mentioned in the above steps for assembling single fuel cell.

Figure 7:
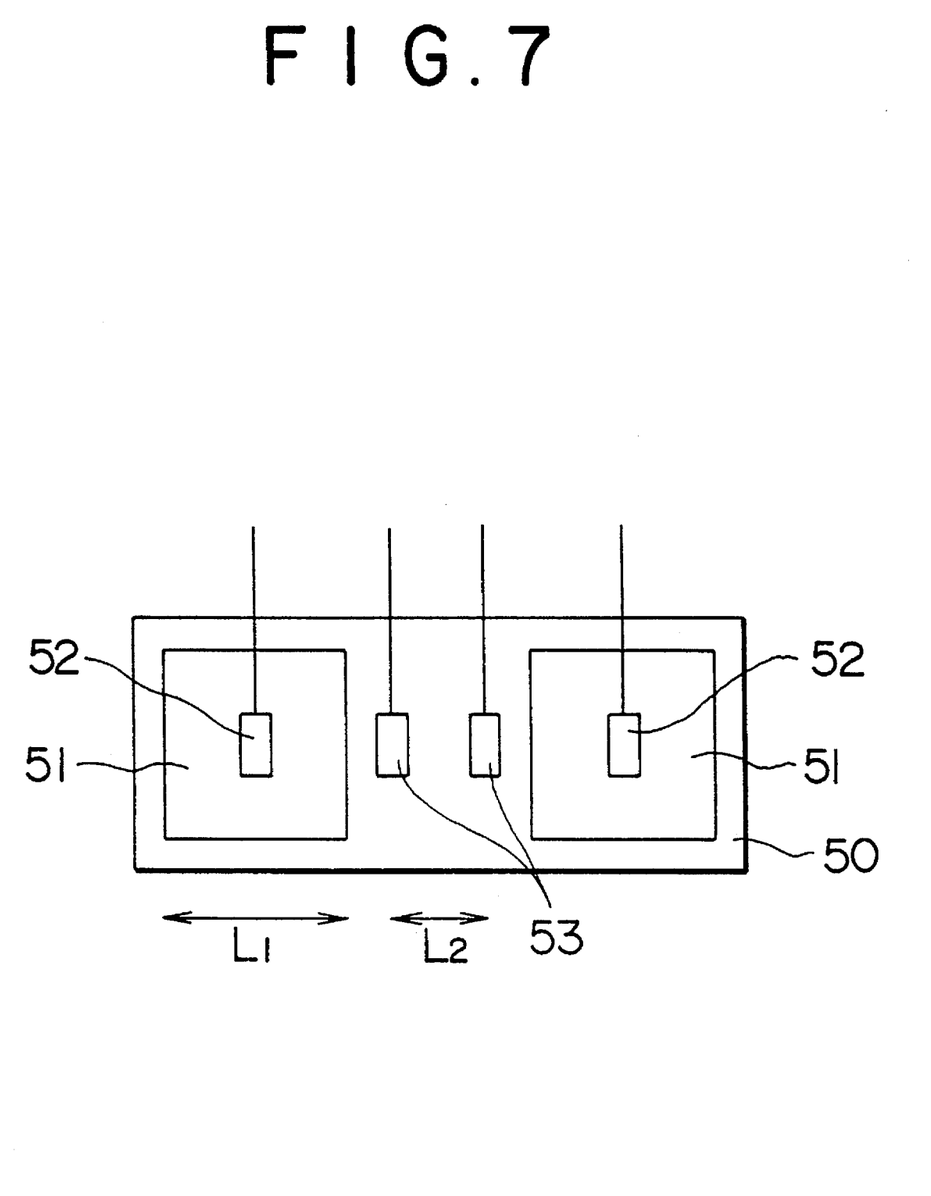
FIG. 7 is an explanatory view of conduct of an experiment to obtain a resistivity index.

In order to examine a resistivity value of the electrode according to the present invention comparing with that of the conventional one, a conventional current collecting member made from the sheet-state carbon and a current collecting member made from porous metallic material such as nickel foam as gas diffusion layer according to the present invention are prepared as shown in FIG. 7. Incidentally, the respective current collecting members are denoted by the same reference numeral 50 in the drawing.

Each member 50 is provided with two square plates 51 made from Cu each having L1 cm on its side. There are provided potential measuring terminals 52 of a potentiometer (not-shown) on the respective plates 51 and electric current measuring terminals 53 on the member 50 with an interval of L2 cm between them. The resistivity $\rho$ ($\Omega \cdot cm$) can be obtained by an equation, $\rho = R \cdot d \cdot L1/L2$ in which the "d (cm)" is a thickness of the member 50 and the "R ($\Omega$)" is an electrical resistance at a portion between a set of the terminals 53 having a uniformed sectional area and can be determined by an equation $R = E/I$ ("I" means the current and "E" means the electrical voltage detected by the potentiometer).

The resistivity value of the conventional electrode results in 0.90 $\Omega \cdot cm$ while that in the present invention shows a remarkable 0.46× $10^{-4}$ $\Omega \cdot cm$.

What is claimed is:

1. A fuel cell having an electrolyte membrane of an ion-exchange resin containing an acidic constituent, and a fuel electrode and an oxidation electrode, on opposite sides of said electrolyte membrane, for receiving different gases, said fuel and oxidation electrodes each comprising:

(a) a gas diffusion layer of a porous metallic material to which said acidic component is corrosive;

(b) a catalyst layer in contact with the electrolyte membrane and containing a catalyst and said ion-exchange resin, containing said acidic constituent, in admixture;

(c) an electrically conductive, corrosion resistant layer intermediate said gas diffusion layer and said catalyst layer, said corrosion resistant layer preventing corrosion of said gas diffusion layer by said acidic component.

2. The fuel cell according to claim 1, further comprising conductive separators respectively in contact with outermost sides of said gas diffusion layers.

3. The fuel cell according to claim 2, wherein each of said conductive separators is adhered to one of said gas diffusion layers by a sealant with conductive contact therebetween.

4. The fuel cell according to claim 3, wherein peripheral sections of said conductive separators extend beyond said gas diffusion layer and are rigidified by additional sealant.

5. The fuel cell according to claim 2, wherein said gas diffusion layer is a Ni foam.

6. The fuel cell according to claim 2, wherein said corrosion resistant layer comprises a carbon sheet.

7. The fuel cell according to claim 6, wherein said catalyst layer is a layer of Pt/Ru or Pt/Sn adhered to one side of said corrosion resistant layer.

8. The fuel cell according to claim 7, wherein said corrosion resistant layer and catalyst layer are adhered to the electrolyte membrane by hot pressing at a temperature of 130° C., under a pressure of 150 Kg/cm$^2$ or less for 20 sec–3 min.

9. The fuel cell according to claim 1, further comprising a reformer for generating hydrogen for feed to said fuel electrode and wherein said catalyst layer of the oxidation electrode contains platinum.

10. A fuel cell, comprising:
    (a) an electrolyte membrane of an ion-exchange resin containing an acidic component;
    (b) an electrode core adjacent to said electrolyte membrane, said electrode core including:
        1. a catalyst layer having an inner surface in contact with said electrolyte membrane and an outer surface, said catalyst layer comprising catalyst and said ion-exchange resin containing said acidic component; and
        2. a corrosion resistant layer, facing said outer surface, for preventing corrosion by said acidic component contained in said electrolyte membrane; and
    (c) a gas-flow separator in contact with the corrosion resistant layer of said electrode core, said gas-flow separator including:
        1. a gas diffusion layer having one side in contact with the corrosion resistant layer; and
        2. a conductive separator secured to the side of said gas diffusion layer opposite said one side.

11. The fuel cell according to claim 10, wherein the sum of thickness of the corrosion resistant layer and thickness of the gas diffusion layer is less than that of the thickness of the same two layers prior to assembly of said fuel cell.

12. The fuel cell according to claim 11, wherein the thicknesses of the gas diffusion layer, the corrosion resistant layer and the catalyst layer are, respectively, 500–800 μm, 100–150 μm and 10–50 μm.

* * * * *

UNITED STATES PATENT AND TRADEMARK OFFICE
CERTIFICATE OF CORRECTION

PATENT NO. : 5,460,896
DATED : October 24, 1995
INVENTOR(S) : Takada, et al

It is certified that error appears in the above-identified patent and that said Letters Patent is hereby corrected as shown below:

The title page, showing the illustrative figure, and columns 1 - 8, should be deleted and substitute therefor the attached title page, and columns 1 - 8.

Signed and Sealed this

Nineteenth Day of November, 1996

*Attest:*

BRUCE LEHMAN

*Attesting Officer*  *Commissioner of Patents and Trademarks*

United States Patent
Takada et al.

[11] Patent Number: 5,460,896
[45] Date of Patent: Oct. 24, 1995

[54] FUEL CELL

[75] Inventors: Noriyuki Takada; Junko Shimizu, both of Hokkaido, Japan

[73] Assignee: Kabushiki Kaisha Equos Research, Japan

[21] Appl. No.: 181,048

[22] Filed: Jan. 14, 1994

[30] Foreign Application Priority Data

Jan. 22, 1993 [JP] Japan .................. 5-027362
Jun. 28, 1993 [JP] Japan .................. 5-178544

[51] Int. Cl.⁶ .................................. H01M 4/94
[52] U.S. Cl. .......................... 429/33; 429/35; 429/42; 429/44
[58] Field of Search .............. 429/44, 45, 30, 35, 429/33, 42

[56] References Cited

U.S. PATENT DOCUMENTS

| | | | |
|---|---|---|---|
| H16 | 1/1986 | Kaun | 429/45 X |
| 4,476,002 | 10/1984 | Howard et al. | 429/44 X |
| 5,071,717 | 12/1991 | Bushnell | 429/44 X |
| 5,242,764 | 9/1993 | Dhar | 429/30 |

FOREIGN PATENT DOCUMENTS

3-295176 12/1991 Japan.

Primary Examiner—Stephen Kalafut
Attorney, Agent, or Firm—Lorusso & Loud

[57] ABSTRACT

A fuel cell essentially formed of an electrolyte membrane and fuel and oxidation electrodes facing each other with the electrolyte membrane between. More particularly, the invention provides an advantageous fuel cell having fuel and oxidation electrodes, each of which has a gas diffusion layer formed from porous metallic material, a catalyst layer contacting the electrolyte membrane and a corrosion resistant layer intermediate the gas diffusion layer and the catalyst layer so that the strong acidic constituent contained in the electrolyte membrane does not corrode the gas diffusion layer.

12 Claims, 6 Drawing Sheets

FUEL CELL

BACKGROUND OF THE INVENTION

1. Field of the Invention

This invention relates to a fuel cell and, more particularly, to a solid-state polymer fuel cell in which a polymer ion-exchange membrane is utilized as an electrolyte membrane.

2. Description of the Related Art

The conventional solid-state polymer fuel cell has a polymer ion-exchange membrane such as NAFION (Trademark of Dupont) and a pair of fuel and oxidation electrodes confronting to each other through the polymer ion-exchange membrane so that the fuel cell fulfills its function as an electric power source in a vehicle when hydrogen and oxygen are supplied into the fuel and oxidation electrodes, respectively.

Such a solid-state polymer fuel cell has been expected to be a preferred electric power source for an electric motor used in the vehicle, alone or in combination with an internal combustion engine such as a gasoline enginé, since it is lightweight, small in size and its electrolyte membrane maintains its solid state without reduction in quantity.

Japanese Patent Application Laid-open No. Hei 3-295176 teaches a typical conventional solid-state polymer fuel cell as depicted in FIG. 8. This fuel cell is generally defined by a solid-state polymer electrolyte membrane 1 and gas diffusion electrodes 2A and 2B fixed on the solid-state polymer electrolyte membrane 1 so as to confront each other via the membrane 1. The gas diffusion electrode 2A, as the fuel electrode, receives hydrogen gas through a gas separator 5 and the other gas diffusion electrode 2B, as the oxidation electrode, receives therein oxygen gas through a gas separator 6.

Both gas separators 5 and 6 are generally constructed of a conductive thin plate (e.g., metal plate) preventing a mixing of the hydrogen and oxygen gases supplied to the fuel and oxidation electrodes, respectively, when plural cells are connected in series. As the gas separators electrically relate to the fuel and oxidation electrodes in series, they are arranged to electrically connect one with the other when plural cells are connected in series.

The gas diffusion electrodes 2A and 2B each include a reaction membrane (3A, 3B) adjacent to the solid-state electrolyte membrane 1 and a gas diffusion membrane (4A, 4B) adjacent to the gas separator (5, 6).

The gas diffusion membranes 4A and 4B are preferably adapted to diffuse the gas such as hydrogen or oxygen fed into the gas separators 5 and 6 and transfer the diffused gas to the reaction membranes 3A and 3B. The gas diffusion membranes 4A and 4B preferably are not corroded by sulfonic group (—SO$_3$H) which is an ingredient of the solid-state polymer electrolyte membrane 1 and have electrical conductivity. Therefore, it has generally been considered that a carbon sheet was the most preferred material for constructing the gas diffusion membrane.

The reaction membranes 3A and 3B is expected to provide a so-called battery reaction at the interfaces contacting with the solid-state polymer electrolyte membrane 1 when receiving the gases fed through the gas diffusion membranes 4A and 4B. Accordingly, a sintered mixture consisting of a water-repellent material such as polytetrafluorethylene (PTFE) and catalyst particles such as platinum (Pt) or platinum supported on carbon black (Pt/C) has generally been used in the art.

However, the carbon sheet used as the gas diffusion membrane for the electrode in the above-mentioned conventional fuel cell unexpectedly shows a high electrical resistance.

The gas permeability of the carbon sheet is only 850 ml•mm/hr•cm$^2$•mmAq according to data shown in a catalog for a generally known carbon paper.

In view of the above, when one desires to achieve an effective electricity generation in one or plural fuel cells, a gas diffusion membrane having lower electrical resistance than the carbon sheet and a high gas permeability becomes particularly important.

Accordingly, the inventor of the present application conceived use of a gas diffusion membrane or layer made from a porous metallic material such as nickel (Ni) foam instead of carbon sheet. Several experiments conducted by the inventor based on that conception showed that an electrode employing the gas diffusion membrane made from such a porous metallic material has a low electrical resistance and more effective diffusion of the gas fed thereto compared with that of the carbon sheet.

However, the nickel is easily corroded by sulfonic groups contained in the electrolyte membrane, thereby unexpectedly dissolving into the electrolyte membrane. The inventor has therefore improved on the conventional fuel cell, as taught in the Japanese Patent Application No. Hei 5-27362, wherein a corrosion resistant layer made from carbon is introduced between the reaction membrane or a catalyst layer and the gas diffusion membrane or a gas diffusion layer.

More particularly, the above-mentioned improved fuel cell included a solid-state electrolyte membrane and fuel and oxidation electrodes, each of which has a gas diffusion layer made from porous metallic material for receiving a hydrogen or oxygen gas, a catalyst layer contacting with the electrolyte membrane and, between the gas diffusion layer and the catalyst layer, a corrosion resistant layer functioning to prevent corrosion of the gas diffusion layer by the strong acidic constituent contained in the electrolyte membrane.

The fuel cell according to the Japanese Patent Application No. Hei 5-27362 may overcome the disadvantages associated with the above-described conventional fuel cell, but it still requires the user to reduce electrical resistance as much as possible.

Other objects, features and advantages of the present invention will become apparent upon reading the following specification and claims when taken in conjunction with the accompanying drawings.

SUMMARY OF THE INVENTION

To overcome the above-noted problems, the present invention provides a fuel cell which essentially includes an electrolyte membrane and fuel and oxidation electrodes facing each other with the electrolyte membrane between them and, more particularly, provides an advantageous fuel cell having the fuel and oxidation electrodes each including a gas diffusion layer formed from porous metallic material, a catalyst layer contacting the electrolyte membrane and a corrosion resistant layer intermediate the gas diffusion layer and the catalyst layer to prevent the strong acidic constituent contained in the electrolyte membrane from corroding the gas diffusion layer.

The fuel cell of the present invention may be understood to further have, on each outermost side of the respective electrodes, a conductive separator.

Included in this invention in view of attaining the same object, is a fuel cell having an electrolyte membrane, an electrode core adjacent to the electrolyte membrane, the electrode core including a catalyst layer contacting the electrolyte membrane and a corrosion resistant layer preventing corrosion by the strong acidic constituent contained in the electrolyte membrane and a gas-flow separator contacting the corrosion resistant layer of the electrode core, the gas-flow separator including a gas diffusion layer contacting the corrosion resistant layer on one side thereof and a conductive separator secured to the other side of the gas diffusion layer. The corrosion resistant layer and the gas diffusion layer are brought into close contact by an externally applied pressure to provide a rough interface between the two layers. In this arrangement, the corrosion resistant layer and the gas diffusion layer are interconnected by pressure to decrease the thickness thereof, so that the electrical resistance will be effectively decreased.

According to the above-described invention, the gas diffusion layer made from porous metallic material has a rather low electrical resistance and good diffusion efficiency for the gases respectively fed into the fuel and oxidation electrodes so that the efficiency of electricity generation is enhanced.

The corrosion resistant layer provided between the gas diffusion layer and the catalyst layer is preferably a carbon sheet.

BRIEF DESCRIPTION OF THE DRAWINGS

FIG. 1 is a diagrammatic view of the entire structure of a fuel cell according to the present invention;

FIG. 5 is an exploded perspective view of the single cell shown in FIG. 4;

DETAILED DESCRIPTION OF THE PREFERRED EMBODIMENT(S)

Certain terminology will be used in the following description for convenience in reference only and will not be limiting.

Still other objects and advantages of the present invention will become readily apparent to those skilled in this art from the following detailed description, wherein only the preferred embodiments of the invention are shown and described, simply by way of illustration of the best mode contemplated for carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

FIG. 1 depicts a laminated fuel cell according to the present invention and, more particularly, a solid-state polymer electrolyte membrane 10, a fuel electrode 11 and an oxidation electrode 15, in the named order so that the electrodes 11 and 15 respectively contact both sides of the membrane 10. The solid-state polymer electrolyte membrane 10 is an ion-exchange membrane which is preferably NAFION but can also be PSSA-PVA (polystyrene sulfonic acid - polyvinylalcohol copolymer) or PSSA-EVOH (polystyrene sulfonic acid - ethylene vinylalcohol copolymer).

The fuel electrode 11 receives therein hydrogen gas as fuel, while the oxidation electrode 15 receives air containing oxygen as oxidant. In the fuel electrode 11 occurs the chemical reaction of $H_2 \rightarrow 2H^+ + 2e^-$ and, in the oxidation electrode 15 occurs the chemical reaction $1/2O_2 + 2H^+ + 2e^- \rightarrow H_2O$ whereby, as can be seen from FIG. 1, hydrogen ions ($H^+$) move to the oxidation electrode 15 from the fuel electrode 11 through the solid-sate polymer electrolyte membrane 10 with electron flow from a conductive separator 19 fixed on the fuel electrode 11 to a conductive separator 20 on the oxidation electrode 15 to generate electrical power. Incidentally, the orientation of the conductive separators 19 and 20 will become apparent later.

The fuel electrode 11 is formed with a gas diffusion layer 12, a corrosion resistant carbon layer 13 contacting the gas diffusion layer 12 and a catalyst layer 14 contacting the solid-state polymer electrolyte membrane 10.

The gas diffusion layer 12 may be, for example, a porous metallic material which can be obtained by soaking a generally known nickel-foam sheet (thickness of 800–1000 μm) in a PTFE solution of about 7.5 weight % for 2 minutes and then drying it in an inactive gas atmosphere.

The corrosion resistant carbon layer 13 is a generally known carbon sheet. Incidentally, particles in the carbon sheet are coated by hydrofuge material contained in the PTFE solution.

The catalyst layer 14 is made by spreading, on the corrosion resistant layer 13, a mixture including a catalyst supported on carbon black and an ion-exchange resin, the ion-exchange resin being one component of the solid-state polymer electrolyte membrane 10, in accordance with a press or screen printing method.

As a preferred catalyst, platinum has been recommended for general use, but it tends to be poisoned by carbon monoxide contained in the hydrogen gas fed into the fuel electrode 11, even if the source of the hydrogen is hydrocarbon gas such as methanol processed in a reformer (shown in FIG. 1). Therefore, the most preferred material for the catalyst is an alloy essentially including Pt/Ru or Pt/Sn.

The gas diffusion layer 12 has a thickness of 500–800 μm. The thickness of the carbon layer 13 and the catalyst layer 14 are 100–150 μm and 10–50 μm, respectively, but they are recommended to be thinner to increase the interface contact area between them as much as possible, without reducing the electrical efficiency of the electrodes, in order to decrease electrical resistance.

Incidentally, the close contact between the gas diffusion layer 12 and the corrosion resistant carbon layer 13 is provided by externally applied pressure so that the thickness of the fuel electrode 11 is thinner than before lamination.

Now turning to the oxidation electrode 15, it can be understood that the entire structure and the manufacturing steps therefor are substantially the same as explained in connection with the fuel electrode. More particularly, it comprises a gas diffusion layer 16 of porous metallic material to which the air (oxygen) is supplied, a corrosion resistant carbon layer 17 adjacent to the gas diffusion layer 16 and a catalyst layer 18 contacting the solid-state polymer electrolyte membrane 10. Incidentally, as has already been explained in connection with the fuel electrode 11, the gas diffusion layer 16 and the corrosion resistant carbon layer 17 are also interconnected with each other.

When the reformer is optionally used as shown in FIG. 1, the material for catalyst layer 18 in the oxidation electrode 15 can be platinum since the catalyst layer 18 is not as likely to be poisoned by carbon monoxide as in the fuel electrode 11.

As can be seen from FIG. 1, the fuel electrode 11 and the oxidation electrode 15 are usually provided with, as outermost layers, the gas separators 19 and 20, serving as the conductive separators, adjacent the gas diffusion layers 12 and 16, respectively. Incidentally, the combination of the gas diffusion layer and the gas separator is described as the gas-flow separator in the following and the combination of the corrosion resistant carbon layer and the catalyst layer is mentioned as an electrode core. The entire fuel cell according to the present invention can be obtained by cold pressing, at 10–20 kg/cm$^2$, one solid-state electrolyte membrane, two electrode cores outside of the solid-state electrolyte membrane and further two gas-flow separators arranged outside of the respective electrode cores as shown in FIG. 1.

One preferred process for manufacturing the above-described fuel cell will now be described.

1. Steps for assembling the electrode cores

The electrode core can be produced by pasting, on one side of the carbon sheet which is preliminary processed in the PTFE solution, a mixture including platinum supported on carbon black or ruthenium, an ion-exchange membrane such as NAFION as the solid-state electrolyte membrane, and a viscous material made of water, alcohol, glycerin, etc. and thereafter drying the viscous material at the temperature of 80° C. in a nitrogen gas or in a vacuum. This process also serves to form the catalyst layer on one side of the corrosion resistant carbon layer.

The above-mentioned electrode core defined by the carbon layer and the catalyst layer is prepared in at least two sets 32 and 33 and they are secured on the solid-state electrolyte membrane 31 by a hot press method carried out at a temperature of 130° C., under the pressure of 150 kg/cm$^2$ or less and for a time period of 20 sec - 3 min., to thereby obtain the electrode core 34 as shown in FIG. 2. Incidentally, the reference numerals 32a and 33a designate the catalyst layers in which the chemical reactions take place and the numerals 32b and 33b designate the corrosion resistant carbon layers.

2. Steps for assembling the gas-flow separator

The porous metallic material such as Ni foam (e.g., "SELMET", Trademark of Sumitomo Denko) or SUS (e.g., NASLON, Trademark of Nippon Seisen) in the form of a mesh is soaked in the PTFE solution and dried in N$_2$ gas atmosphere at a temperature of 350° C. so as to have a water-repellent property.

The thus-processed porous metallic material is attached to one side of the separator made from aluminum (Al), copper (Cu) or carbon having 0 (zero) gas permeability and is further securely connected with the separator by means of a sealant such as a thermoset resin adhesive additionally supplied to the interface between them to increase air tightness.

Accordingly, as shown in FIG. 3, the objective gas-flow separator 37 defined by the gas diffusion layer 35 and the separator 36 in a state of interconnection can be obtained. Incidentally, the reference numeral 38 designates the sealant.

3. Steps for assembling single fuel cell

As shown in FIG. 4, a single fuel cell 30 can be assembled with the structure 34 shown in FIG. 2 and two of the gas-flow separators 37 shown in FIG. 3. The connection between members 34 and 37, as shown in FIGS. 4 and 5, is by a sealant 38 spread over the interface between them under an external pressure of 10 kg/cm$^2$. The peripheral section of the separators 36 which is exposed (not covered by the gas diffusion layer) is rigidified by additional sealant 39.

4. Steps for laminating several fuel cell

A combination 40 of several fuel cells in series, for example 4 fuel cells, can be obtained as shown in FIG. 6 by using the gas-flow separator 37 as a connector or coupling for adjacent structures, as shown in FIG. 2, by the same method described above for assembling a single fuel cell.

In order to examine the resistivity of the electrode according to the present invention, comparing it with that of the conventional electrode, a conventional current collecting member made from the carbon sheet and a current collecting member made from porous metallic material such as nickel foam, employed as a gas diffusion layer according to the present invention, are prepared as shown in FIG. 7. Incidentally, the respective current collecting members are denoted by the same reference numeral 50 in the drawing.

Each member 50 is provided with two square plates 51 made from Cu, each of L1 cm on its side. Potential measuring terminals 52 of a potentiometer (not-shown) are provided on the respective plates 51 and electric current measuring terminals 53 are provided on the member 50 with an interval of L2 cm between them. The resistivity p ($\Omega \cdot cm$) can be obtained by the equation, $p = R \cdot d \cdot L1/L2$ in which the "d (cm)" is the thickness of the member 50 and the "R ($\Omega$)" is the electrical resistance between a set of the terminals 53 having a uniform sectional area and can be determined by the equation $R = E/I$ (wherein "I" is the current and "E" is the electrical voltage detected by the potentiometer).

The resistivity value for the conventional electrode was found to be 0.90 $\Omega \cdot cm$ while that in the present invention was a remarkable $0.46 \times 10^{-4} \Omega \cdot cm$.

What is claimed is:

1. A fuel cell having an electrolyte membrane of an ion-exchange resin containing an acidic constituent, and a fuel electrode and an oxidation electrode, on opposite sides of said electrolyte membrane, for receiving different gases, said fuel and oxidation electrodes each comprising:
   (a) a gas diffusion layer of a porous metallic material to which said acidic component is corrosive;
   (b) a catalyst layer in contact with the electrolyte membrane and containing a catalyst and said ion-exchange resin, containing said acidic constituent, in admixture;
   (c) an electrically conductive, corrosion resistant layer intermediate said gas diffusion layer and said catalyst layer, said corrosion resistant layer preventing corrosion of said gas diffusion layer by said acidic component.

2. The fuel cell according to claim 1, further comprising conductive separators respectively in contact with outermost sides of said gas diffusion layers.

3. The fuel cell according to claim 2, wherein each of said conductive separators is adhered to one of said gas diffusion layers by a sealant with conductive contact therebetween.

4. The fuel cell according to claim 3, wherein peripheral sections of said conductive separators extend beyond said gas diffusion layer and are rigidified by additional sealant.

5. The fuel cell according to claim 2, wherein said gas diffusion layer is a Ni foam.

6. The fuel cell according to claim 2, wherein said corrosion resistant layer comprises a carbon sheet.

7. The fuel cell according to claim 6, wherein said catalyst layer is a layer of Pt/Ru or Pt/Sn adhered to one side of said corrosion resistant layer.

8. The fuel cell according to claim 7, wherein said corrosion resistant layer and catalyst layer are adhered to the electrolyte membrane by hot pressing at a temperature of 130° C., under a pressure of 150 Kg/cm$^2$ or less for 20 sec - 3 min.

9. The fuel cell according to claim 1, further comprising a reformer for generating hydrogen for feed to said fuel electrode and wherein said catalyst layer of the oxidation electrode contains platinum.

10. A fuel cell, comprising:

(a) an electrolyte membrane of an ion-exchange resin containing an acidic component;

(b) an electrode core adjacent to said electrolyte membrane, said electrode core including:
1. a catalyst layer having an inner surface in contact with said electrolyte membrane and an outer surface, said catalyst layer comprising catalyst and said ion-exchange resin containing said acidic component; and
2. a corrosion resistant layer, facing said outer surface, for preventing corrosion by said acidic component contained in said electrolyte membrane; and (c) a gas-flow separator in contact with the corrosion resistant layer of said electrode core, said gas-flow separator including:
1. a gas diffusion layer having one side in contact with the corrosion resistant layer; and
2. a conductive separator secured to the side of said gas diffusion layer opposite said one side.

11. The fuel cell according to claim 10, wherein the sum of thickness of the corrosion resistant layer and thickness of the gas diffusion layer is less than that of the thickness of the same two layers prior to assembly of said fuel cell.

12. The fuel cell according to claim 11, wherein the thicknesses of the gas diffusion layer, the corrosion resistant layer and the catalyst layer are, respectively, 500–800 $\mu$m, 100–150 $\mu$m and 10–50 $\mu$m.

* * * * *